United States Patent
Kuhn et al.

(10) Patent No.: US 11,516,279 B2
(45) Date of Patent: Nov. 29, 2022

(54) SYSTEMS AND METHODS FOR ACCESSING MULTIPLE RESOURCES VIA ONE IDENTIFIER

(71) Applicant: Google LLC, Mountain View, CA (US)

(72) Inventors: Brian Kuhn, Irvine, CA (US); Shengyue Ji, Mountain View, CA (US); Xin Liu, Irvine, CA (US)

(73) Assignee: Google LLC, Mountain View, CA (US)

( * ) Notice: Subject to any disclaimer, the term of this patent is extended or adjusted under 35 U.S.C. 154(b) by 95 days.

(21) Appl. No.: 17/196,991

(22) Filed: Mar. 9, 2021

(65) Prior Publication Data

US 2021/0194949 A1 Jun. 24, 2021

Related U.S. Application Data

(60) Continuation of application No. 16/704,893, filed on Dec. 5, 2019, now Pat. No. 10,951,682, which is a division of application No. 15/684,869, filed on Aug. 23, 2017, now Pat. No. 10,701,128, which is a continuation of application No. 13/954,700, filed on Jul. 30, 2013, now Pat. No. 9,749,304.

(51) Int. Cl.
*H04L 29/06* (2006.01)
*H04L 67/02* (2022.01)
*H04L 9/40* (2022.01)

(52) U.S. Cl.
CPC .......... *H04L 67/02* (2013.01); *H04L 63/0807* (2013.01); *H04L 63/168* (2013.01)

(58) Field of Classification Search
CPC ............................. H04L 67/02; H04L 63/0807
See application file for complete search history.

(56) References Cited

U.S. PATENT DOCUMENTS

| | | | |
|---|---|---|---|
| 8,972,493 B2 * | 3/2015 | Cobb | G06F 9/5072 709/219 |
| 9,401,904 B1 | 7/2016 | Hankins et al. | |
| 2005/0066037 A1 * | 3/2005 | Song | G06F 16/95 709/227 |
| 2007/0156726 A1 | 7/2007 | Levy | |
| 2009/0037517 A1 | 2/2009 | Frei | |
| 2009/0085724 A1 * | 4/2009 | Naressi | G06F 21/10 340/10.6 |
| 2009/0307783 A1 | 12/2009 | Maeda et al. | |
| 2012/0066052 A1 * | 3/2012 | Robert | G06Q 30/02 707/769 |
| 2012/0209923 A1 | 8/2012 | Mathur et al. | |

(Continued)

FOREIGN PATENT DOCUMENTS

EP 2096569 A1 9/2009

*Primary Examiner* — Jason K Gee
(74) *Attorney, Agent, or Firm* — Honigman LLP; Brett A. Krueger

(57) ABSTRACT

A computer-implemented method includes receiving, by an application executing on a computing device, a first environment with a first identifier, in response to a first request comprising an authentication code. The method further includes associating, by the application, the first identifier with the authentication code, sending, by the application, a second request comprising the first identifier and the authentication code, and in response to sending the second request, receiving, by the application, a second environment with a second identifier. The second environment is a version snapshot of the first environment.

20 Claims, 12 Drawing Sheets

(56) References Cited

U.S. PATENT DOCUMENTS

| | | |
|---|---|---|
| 2012/0233120 A1 | 9/2012 | Nijim et al. |
| 2012/0291103 A1 | 11/2012 | Cohen |
| 2012/0331108 A1 | 12/2012 | Ferdowsi et al. |
| 2013/0067303 A1 | 3/2013 | Kantor et al. |
| 2013/0326614 A1* | 12/2013 | Truskovsky .......... G06F 21/335 726/19 |

* cited by examiner

```
https://www.D1.com/set_cookie?AC=<auth_code>&
Rid=<resource_id>&MRid=<mapped_Rid>[&flag=<debug_mode>][&url=<a.com>]    ← 440
```

```
HTTP/1.1 302 Found
Set-Cookie: MRid=<resource_id>=<mapped_Rid>
Set-Cookie: AC=<resource_id>=<auth_code>; secure          ⎫ 510
Set-Cookie: flag=<resource_id>=<debug_mode>               ⎭
Location: http://www.D1.com/clear_cache?Rid=<resource_id>& ⎫ 520
MRid=<mapped_Rid>[&flag=<debug_mode>][&url=<a.com>]        ⎭
```

```
http://www.D1.com/clear_cache?Rid=<resource_id>&MRid=<mapped_Rid>
[&flag=<debug_mode>]{&url=<a.com>]                                    ⟵ 520

<script src="RA.js?Rid=<resource_id>"></script>   ⎫
<script>                                          ⎪
if (window.location.hash != '#done') {            ⎪
  window.location.hash = '#done';                 ⎪
  window.location.reload(true);                   ⎬ 610
} else {                                          ⎪
  window.location = 'https://www.D2.com/scc?Rid=<resource_id>
  &MRid=<mapped_Rid>{&url=<a.com>];               ⎪         ⤹ 620
}                                                 ⎪
</script>                                         ⎭
<meta http-equiv="refresh" content="0;URL=https://www.D2.com/scc?   ⎫ 615
Rid=<resource_id>&MRid=<mapped_Rid>[&url=<a.com>]">                  ⎭
                                                          ⤹ 620
```

FIG. 6

700 https://www.D2.com/scc?Rid=<resource_id>&MRid=<mapped_Rid> [&url=<a.com>] ~620

Referer: http://www.D1.com/clear_cache?Rid=<resource_id> &MRid=<mapped_Rid> [&flag=<debug_mode>][&url=<a.com>] ~520

Preview/debug resource <mapped_Rid>

Your browser is now ready to preview/debug version <mapped_Rid> of the resource with <resource_id>. Please verify that the <mapped_Rid> version behaves as expected. Please click on the following link or go to another website to access the <mapped_Rid> version.

http://a.com ~710

☑ Debugging

Click here to stop previewing/debugging.

FIG. 7

```
https://www.D1.com/set_cookie?Rid=<resource_id>&AC=&MRid=[&flag=]  ← 910

HTTP/1.1 302 Found
Set-Cookie: MRid=<resource_id>==
Set-Cookie: AC=<resource_id>==
Set-Cookie: flag=<resource_id>==
Location:....
```

FIG. 9

SYSTEMS AND METHODS FOR ACCESSING MULTIPLE RESOURCES VIA ONE IDENTIFIER

CROSS REFERENCE TO RELATED APPLICATIONS

This U.S. patent application is a continuation of, and claims priority under 35 U.S.C. § 120 from, U.S. patent application Ser. No. 16/704,893, filed on Dec. 5, 2019, which is a divisional of, and claims priority under 35 U.S.C. § 121 from, U.S. patent application Ser. No. 15/684,869, filed on Aug. 23, 2017, which is continuation of, and claims priority under 35 U.S.C. § 120 from, U.S. patent application Ser. No. 13/954,700, filed on Jul. 30, 2013. The disclosures of these prior applications are considered part of the disclosure of this application and are hereby incorporated by reference in their entireties.

TECHNICAL FIELD

The subject matter discussed herein relates generally to resource management and, more particularly, to systems and methods for accessing multiple resources via one identifier.

BACKGROUND

Many online platforms (e.g., websites, social networks, etc.) require users to register and login to access the platforms (e.g., access the contents, web pages, or resources available on the platforms). Typically these platforms do not allow a logged-in user to share resources with users who are not registered with the platform.

For registered users, online resources, such as webpages, media files on a website or in a cloud storage, etc. are conventionally accessed using resource names, identifiers, or locators. In some situations, a resource identifier (e.g., a Uniform Resource Locator or URL) used to access a resource (Resource 1) may be embedded in another resource or webpage (Resource 2).

To allow or grant different users to access different version of Resource 1 (or different resources) via Resource 2, the granter need to produce and manage different copies or versions of Resource 2, which may cause confusion, mix-ups, errors (e.g., the granter mistakenly embedding identifiers of wrong versions of Resource 1 in two versions of Resource 2).

In some situations, the granter cannot change (i.e., does not have access or control of) Resource 2 to embed a different identifier of Resource 1. Thus, the granter cannot grant access to another resource or another version of Resource 1 via Resource 2.

In some situations, such as in development and/or testing of new versions of Resource 1, it is desired to keep as much unchanged as possible (e.g., keeping Resource 2 unchanged).

SUMMARY

According to an aspect, a computer-implemented method for accessing multiple resources via one identifier is provided, including receiving an input that includes at least an authentication code from an application; associating the authentication code with a resource; receiving another input, which includes at least an identifier associated with the resource and the authentication code, from the application requesting the resource; determining that the application can access another resource based on the authentication code; and based on the determining, providing the another resource to the application.

In addition to the computer-implemented method as described above, the implementations may include a device, a system, and/or a computer-readable medium, but are not limited thereto.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 shows an example resource mapping mechanism.
FIG. 6 shows an example optional operation.
FIG. 7 shows another example user interface used in some implementations.
FIG. 9 shows another example optional operation.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for accessing multiple resources via one identifier.

Figure 1:
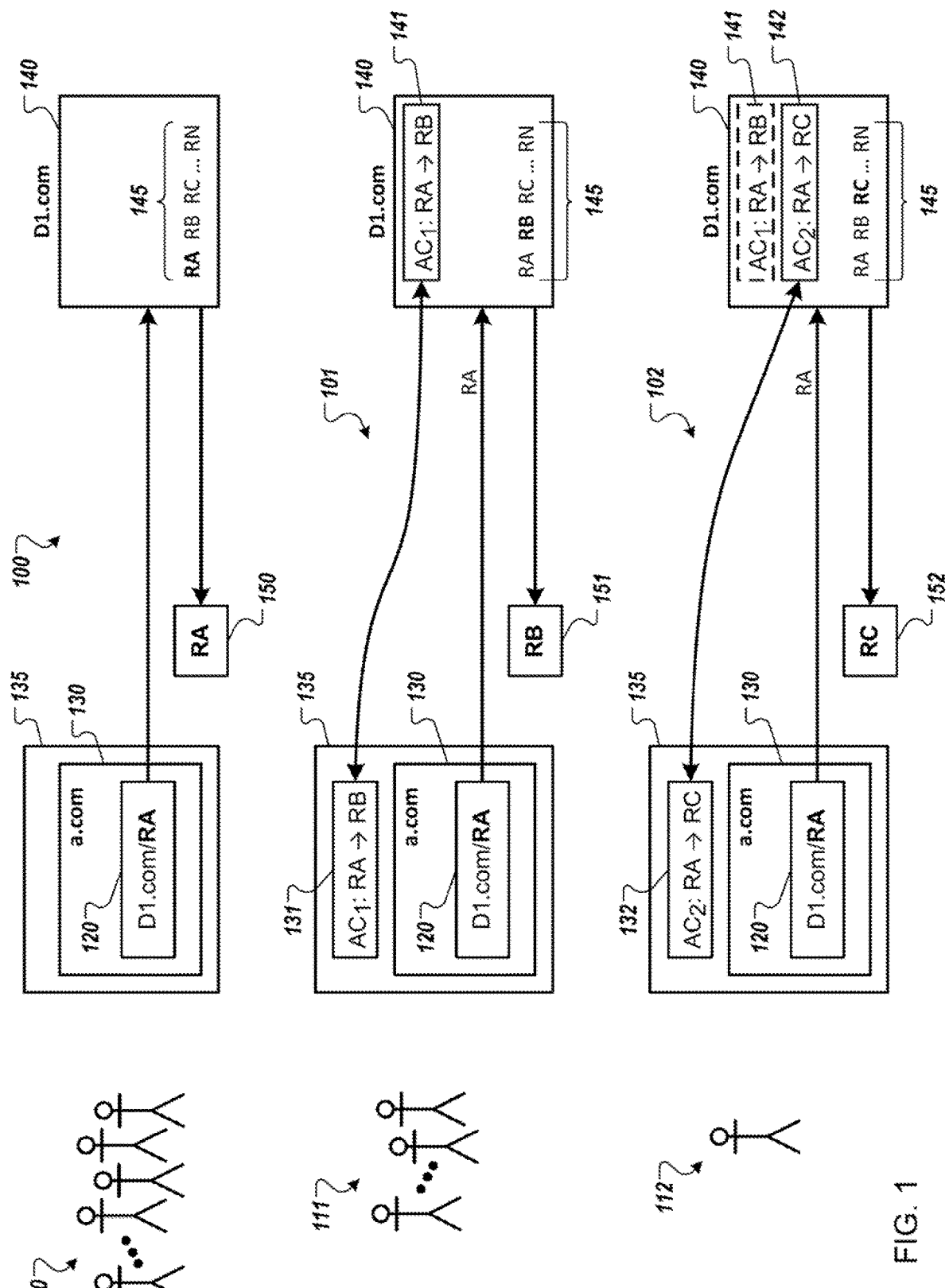
FIG. 1 shows a diagram of high-level data flow examples.

FIG. 1 shows a diagram of high-level data flow examples. FIG. 1 illustrates three example scenarios 100-102. Scenario 100 includes one or more users 110, who access a resource (e.g., "RA") using identifier 120 (e.g., "D1.com/RA") from or via resource 130 (e.g., identifier 120 is embedded in a webpage 130 hosted by website "a.com"). Resource 130 may be accessed using an application 135 (e.g., a browser; i.e., users 110 may access using different/multiple applications 135). Identifier 120 identifies the resource provider or host 140 (e.g., "D1.com"), which hosts resources 145 that includes the resource "RA" being accessed.

Based on identifier 120, host 140 identifies and provides resource 150 (e.g., "RA") to users 110 (e.g., allows users 110 to access resource "RA").

Identifier 120 may be any identifier that can be used to identify a resource. Example identifiers include, but are not limited to, URLs, serial numbers, names, unique identifiers, symbols, links, references, etc. Resource 130 may be a service, product, website, webpage, host, server, system, document, file, application, etc. that can be used to access resources. Application 135 may be any application, program, device, etc. that can be used to access resource 130 and/or 140. Host 140 may be any provider, storage, host, website, webpage, etc. that hosts and/or provides access to resources. Resources 145 may be any resources or combination of resources, such as webpages, images, audios, video, file, document, or any digital content.

The examples domains "a.com" and "D1.com" may be controlled by different business entities. In some implementations, resource 130 and resources 145 may be hosted, stored, or otherwise managed by the same service or resource provider or host (e.g., "a.com" and "D1.com" belong to, controlled by, operated by, or managed by the same provider or host). In some implementations, "a.com" and "D1.com" may be the same (i.e., referring to the same domain or website).

Scenario 101 illustrates that a different resource (e.g., "RB" 151) may be accessed using the same identifier (e.g., ""D1.com/RA" 120). Scenario 101 includes one or more users 111, who are granted accesses to a different resource "RB" (or a different version of the same resource "RA") using the same identifier 120. Even if the example host 140 (e.g., "D1.com") requires the granter to be a registered user to grant users 111 access to one or more resources, none of users 111 need to, but may, register with D1.com to access the resources (e.g., "RB" 151, "RA" 150, etc.).

To grant access to a resource, a granter, who has control of or the authority to grant access to the resource (e.g., the resource is created or managed by the granter) sends at least an authentication code (AC) to users 111. Granting access to resources is described further in FIG. 2 below.

Users 111 use the authentication code to access the resource. Box 131 shows example information users 111 may use to gain access to a resource. Before users 111 request a resource or at the time when users 111 are requesting the resource (e.g., using identifier 120), users 111 may activate, enable, or otherwise use the information shown in box 131 to gain access or permission to the resource.

Box 131 includes at least an authentication code (e.g., "AC1"). In some implementations, box 131 may include other information, such as information for mapping resource "RA" to resource "RB" (shown as "RA→RB"). The authentication code and/or mapping may be stored anywhere (e.g., at the device, not shown, where application 135 is executed, at a.com, D1.com, and/or at another location) and made available to D1.com for use to determine whether to grant access to a resource.

In an example implementation, application 135 may be a browser and host 140 may be a website D1.com. The authentication code AC1 and/or mapping may be stored as one or more cookies by browser 135 in association with website D1.com. For example, box 131 may be a link to a webpage on host 140 that sets one or more cookies to store at least AC1 with browser 135. Afterwards, as long as the cookies are available (e.g., the cookies have not been deleted and security settings of browser 135 have not been set to disable cookies), every time browser 135 is used to access some resource or webpage hosted at D1.com, browser 135 sends the cookies associated with D1.com to D1.com.

For example, when users 111 access the resource (e.g., "RA") with identifier 120 (e.g., "D1.com/RA") using browser 135 (e.g., accessing from a.com or via resource 130 hosted on a.com), browser 135 sends along the cookies previously set that include at least the authentication code AC1. Host 140 uses AC1 to determine whether the access, regardless of who the user is, is authorized (e.g., authenticating AC1). When AC1 is authenticated, host 140 provides the requested resource. In the absence of a mapping, the requested resource, based on identifier 120 (e.g., "D1.com/RA") is "RA" 150. However, in scenario 101, there is a mapping (e.g., "RA→RB"). Based on the mapping, host 140 identifies and provides the mapped resource "RB" 151 to users 111 (e.g., allows users 111 to access resource "RB"). Information 141 illustrates that host 140 uses the information to authenticate accesses with authentication code AC1 and/or determine a resource (e.g., "RB" 151) to return in response to the access request using identifier 120. Information 141 may be stored anywhere (e.g., at D1.com, with application 135, at another location, etc.).

Scenario 102 illustrates yet another resource (e.g., "RC" 152) may be accessed using the same identifier (e.g., ""D1.com/RA" 120). Scenario 102 includes one or more users 112, who are granted accesses, based on information 132, to yet another resource "RC" using the same identifier 120. As discussed above, even if the example host 140 (e.g., "D1.com") requires the granter to be a registered user to grant access to one or more resources, none of users 112 need to, but may, register with D1.com to access the resources (e.g., "RC" 152, "RA" 150, etc.). Host 140 is provided with information 142 to authenticate accesses using authentication code AC2 and/or determine a resource (e.g., "RC" 152) to return in response to the access request using identifier 120. Information 142 may be stored anywhere.

As used herein, in the description and drawings of this patent application, the leading "www" character string of the example domain names (e.g., D1.com, D2.com, a.com, etc.) is omitted. However, as understood by those one skilled in the art, may include (but is not limited to) the standard leading "www" character string or other leading character string.

Figure 2:
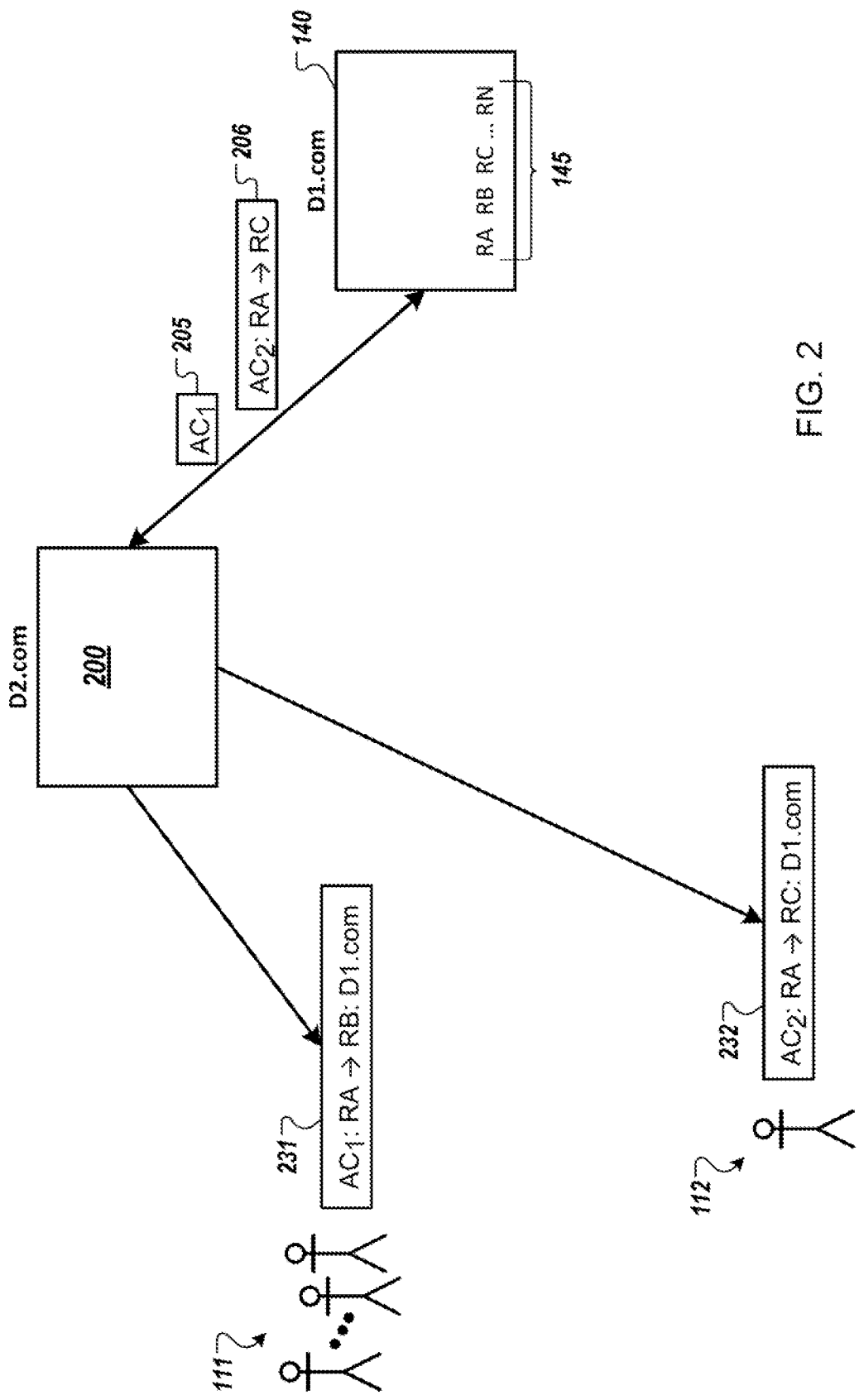
FIG. 2 shows an example mechanism for granting access to resources.

FIG. 2 shows an example mechanism for granting access to resources. A user (not shown) may use mechanism or domain 200 (e.g., "D2.com") to grant other users access to resources 145 hosted or provided by, for example, host 140 (e.g., "D1.com"). The examples domains D2.com and D1.com may be controlled, managed, and/or operated by different business entities, which may have agreements in place to allow a granter to user D2.com to grant access to resources on D1.com. In some implementations, D2.com and D1.com may be controlled, managed, and/or operated by the same entity, service provider, or resource provider. In some implementations, "D2.com" and "D1.com" may be the same (i.e., referring to the same domain or website).

The granter may create or modify a resource 145, if needed, before granting accesses to it. To grant access to a resource, a granter may create or select an authentication code (e.g., "AC1" 205 or "AC2" 206) for D1.com to authenticate accesses to resources. Authentication codes may be created by D2.com, D1.com, and/or on another system or domain. In some implementations, the granter may select an authentication code available on D1.com and/or on another system or domain. The authentication codes may be created in such ways that allow D1.com to authenticate them. In some implementations, the authentication codes may be provided to D1.com, if not created there or selected from there, for use to authenticate accesses to resources.

An authentication code, such as "AC1" 205 may be used to authenticate access any resource hosted by D1.com. In some implementations, an authentication code, such as "AC2" 206 may be associated with one or more resources and can be used only to access the associated resources (e.g., resource "RA" and/or "RC").

Once an authentication code (e.g., "AC1" 205) and, in some situations, an associated resource (e.g., "AC2" 206 with associated resource "RC") are been established, the information (e.g., information 231 or 232) may be provided, in any manner, such as sent by emails, to the users 111 or 112, respectively, who have been granted or allowed access to one or more resources. Users 111 receive information 231 as information 131, FIG. 1. Users 112 receive information 232 as information 133, FIG. 1. Information 131 or 132, together with an accessing mechanism (e.g., resource or webpage 130) allow users 111 or 112 to access the granted resource "RB" 151 or "RC" 152, respectively.

Figure 3:
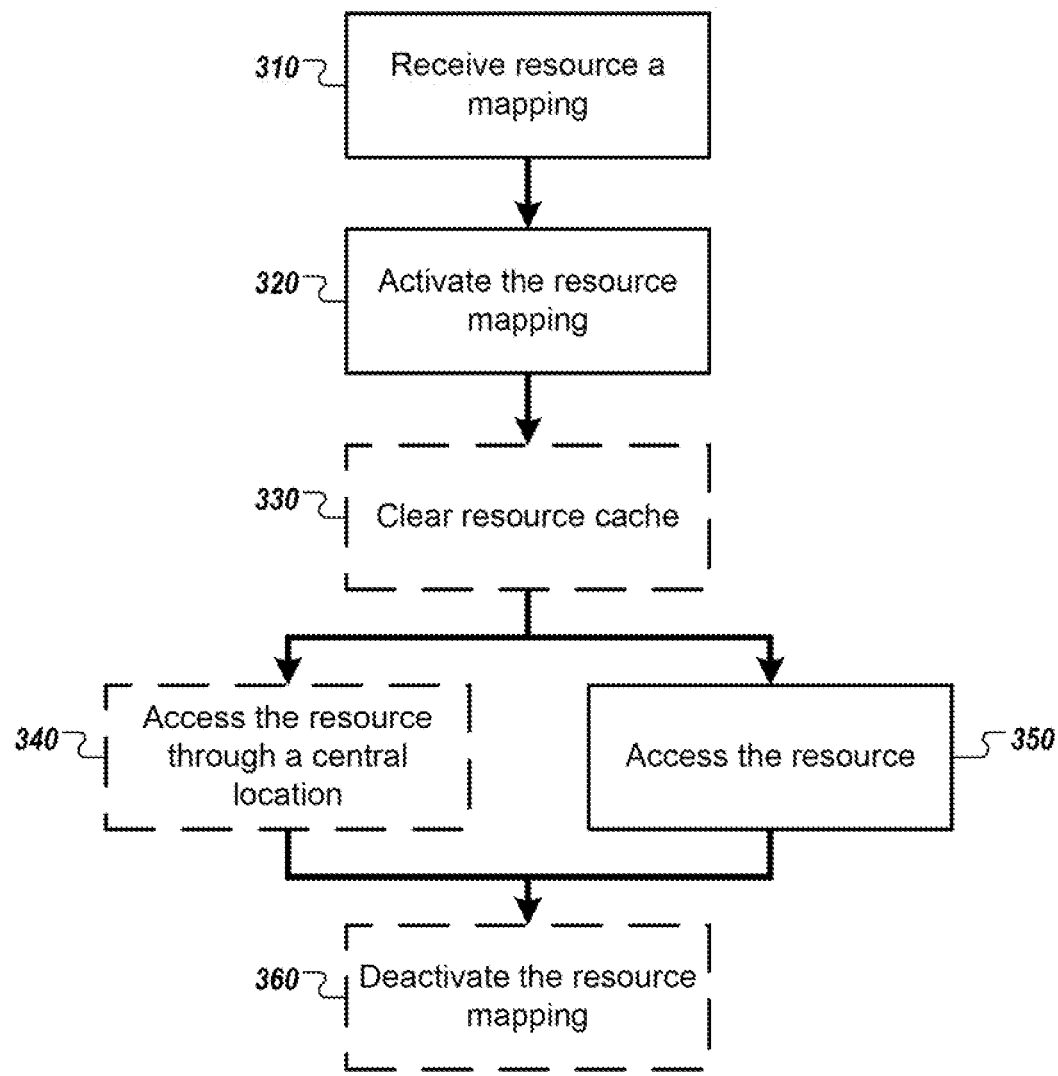
FIG. 3 shows an example of a process implementation.

FIG. 3 shows an example of a process implementation. At block 310, one or more users (e.g., users 111 or 112) receive a resource mapping. The resource mapping (e.g., "RA→RB" or "RA→RC") may arrive with an authentication code for accessing the mapped resource. An example or a resource mapping is described in FIG. 4 below. At block 320, the resource mapping may be activated or otherwise made available. An example resource mapping mechanism is described in FIG. 5 below. At block 330, an optional operation to clear a resource cache may be performed. The resource cache is cleared in situations where a cached resource may be different from the requested resource. The example optional cache clearing operation is described in FIG. 6 below. At block 340, the resource may be accessed from a central location, which is described in FIG. 7 below. In the alternative or in addition, at block 350, the resource may be accessed from another location, which is described in FIG. 8 below. At block 360, an optional operation to deactivate or remove the resource mapping may be performed. The example optional deactivation operation is described in FIG. 9 below.

In some examples, the process of FIG. 3 may be implemented with different, fewer, or more blocks. The process may be implemented as computer executable instructions, which can be stored on a medium, loaded onto one or more processors of one or more computing devices, and executed as a computer-implemented method.

FIGS. 4-9 illustrate example implementations of accessing multiple resources via one identifier in a software application development environment (ADE). For example, in an ADE, different versions of resources may need to be developed. During development and before a version of a resource is published or released to the production environment (e.g., live environment for actual usage), a resource may need to be previewed, verified, tested, and/or debugged.

Figure 4:
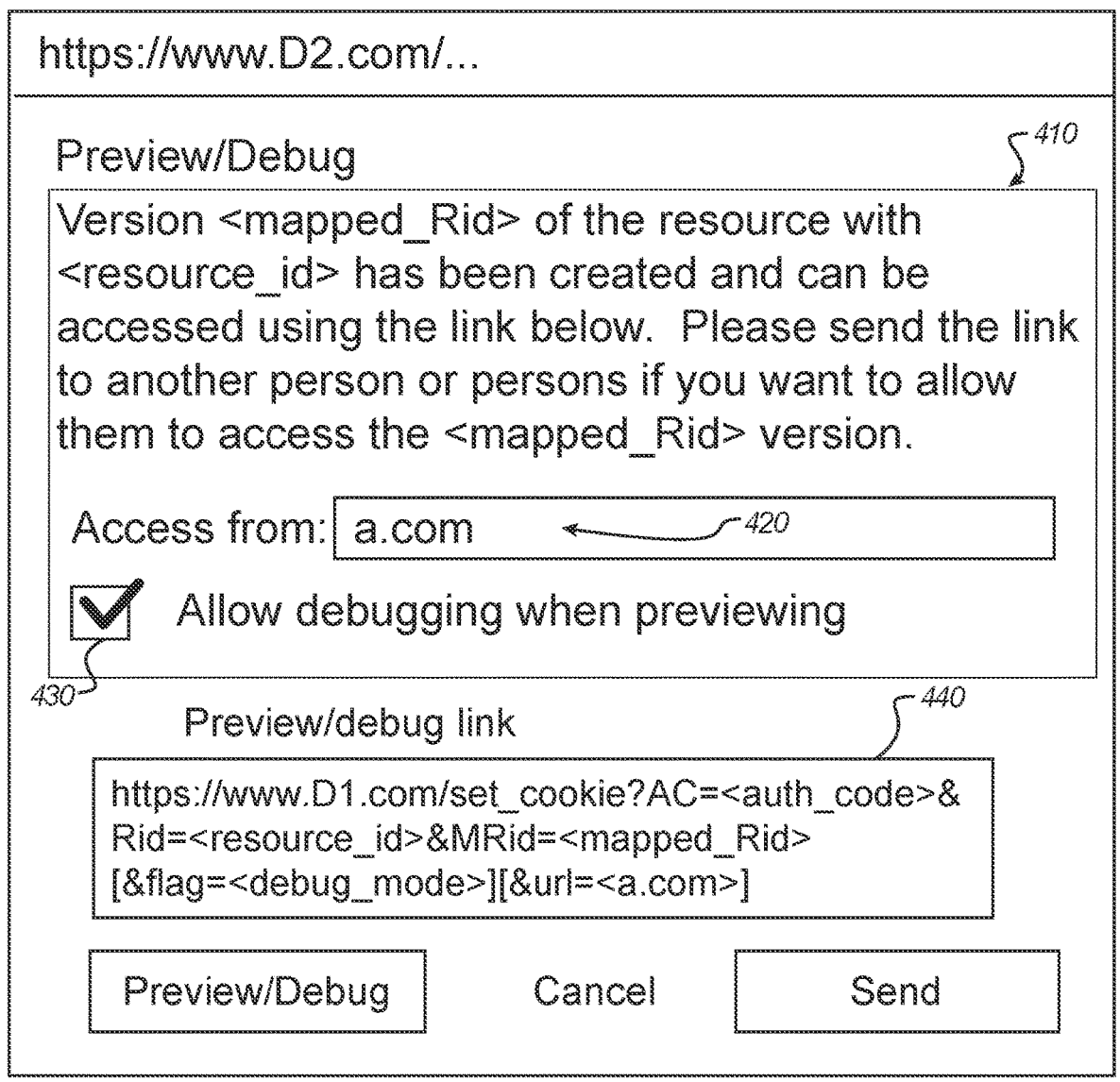
FIG. 4 shows an example user interface used in some implementations.

FIG. 4 shows an example user interface (UI) used in some implementations. An application developer creates, for example, a new version (e.g., a snapshot) of a resource with changes. To verify and/or validate the changes, UI 400, which may be provided on domain 200 (FIG. 2), for example, may be used to grant other developers, testers, or users (collectively referred to as viewers) access to the unpublished version of the resource, as indicated by message 410. The developer or granter may optionally indicate where the resource is hosted (e.g., a.com 420). The developer may provide one or more additional setting, such as a setting to allow the viewers to view or access the snapshot of changes under a debug mode 430. UI 400 then generates the link 440 for the developer to send to the viewers. The developer and/or viewers who are registered to access the domain or system that provides UI 400 may also initiate viewing or previewing the link using the "Preview/Debug" button.

Information 231 or 232 (FIG. 2) or information 131 or 132 (FIG. 1) represents the information or similar information provided by link 440. For example, link 440 includes the name of the domain "D1.com," which may be accessed using the Hypertext Transfer Protocol or HTTP in the secure mode (i.e., HTTPS). The mechanism (e.g., a "set_cookie" webpage) for activating or enabling resource mapping is, in this example, setting one or more cookies with the accessing browser. The example variable "AC" contains the value of the authentication code (shown as "<auth_code>"). The variable "Rid" contains the resource identifier or ID (shown as "<resource_id>"). In some implementations, the name of the resource itself (e.g., "RA") may be used to identify the resource without the variable-value pair "Rid=<resource_id>". The variable "MRid" contains the value of an identifier of the new version of the resource or new resource (shown as "<mapped_Rid>"). Link 440 may include other variable-value pairs, such as "flag=<debug_mode>" associated with the setting of the debug_mode 430 and "url=<a.com>" associated with the identifier of the resource host 420.

FIG. 5 shows an example resource mapping mechanism 500. Mechanism 500 may be, for example, a set_cookie webpage for setting one or more cookies on the D1.com domain. After the link 440 is activated or clicked on (e.g., by a viewer after receiving the link from the sender/developer or by a developer or viewer using the "Preview/Debug" button of UI 400), domain D1.com may validate the authentication code <auth_code> and/or set the cookies 510. Cookies are set only when the authentication code <auth_code> matches the one stored for the <mapped_Rid> resource, unless the <auth_code> is associated with other resources or is one that can be used to access other resources.

In this example implementation, three cookie key-value pairs are set. For example, the first key-value pair is "MRid=<resource_id>=<mapped_Rid>" where MRid is the cookie key (key 1) and "<resource_id>=<mapped_Rid>" is the cookie value (value 1), which itself is a nested key-value pair. The other example cookie key-value pairs are "AC" (key 2)="<resource_id>=<auth_code>" (value 2) and "flag" (key 3)="<resource_id>=<debug_mode>" (value 3). Values 1 to 3 provide D1.com the mappings and/or settings to handle <resource_id> (i.e., resource <resource_id> is mapped to <mapped_Rid>, authorized using <auth_code>, and provided according to <debug_mode>).

In some implementations, the set_cookie page may redirect (e.g., using HTTP status code 302) to a clear_cache page to clear the browser cache of previously loaded/accessed resources. The URL to the clear_cache page 520 may pass along some or all the query parameters (e.g., variable-value pairs, such as Rid=<resource_id>, MRid=<mapped_Rid>, flag=<debug_mode>, and url=<a.com>). In some implementations, the clear_cache page or another redirect webpage does not include a parameter for the <auth_code> for security and/or other purposes.

Implementing the set_cookie page as a top level page ensures that cookies set for the D1.com domain are return with all D1.com accesses. The set_cookie mechanism is an example mechanism that allows a viewer to view, preview, and/or debug multiple resources at the same time (e.g., not limiting the viewer to access only one preview/debug resource at a time).

FIG. 6 shows an example optional operation. The optional clear cache operation, activated with link 520, includes, for example, a script portion 610 (e.g., JavaScript) and a meta tag portion 615. The operation is designed to clear the browser cache of the resource "RA". In this example, the "RA" resource is illustrated as a JavaScript resource (i.e., with the ".js" file extension). In portion 610, the RAjs cache is cleared using the JavaScript window.location.reload function. After clearing the cache, the clear_cache page may optionally redirect to another page (e.g., a "scc" page 620)

using the JavaScript window.location object. If JavaScript is disabled for a browser (i.e., the script in portion 610 is not executed), the clear_cache page may, in portion 620, optionally redirect to another page (e.g., a "scc" page 620) using a meta tag without clearing the cache.

Link 520 for the clear_cache operation is implemented using HTTP instead of HTTPS to avoid triggering a browser warning of mixed content. When D1.com gets the HTTP RA.js request, it does not receive the authentication code <auth_code> since <auth_code> is stored with a secure cookie. D1.com may be implemented to redirect the HTTP request to HTTPS, which will receive the secure cookie with the authentication code <auth_code>. D1.com then able to successfully authorize the clear_cache requests and clear the caches for the RAjs resource for both the HTTP and HTTPS.

FIG. 7 shows another example user interface used in some implementations. UI 700 or webpage 700 allows viewers to access resources from a central location. UI 700 is an example webpage accessed using the URL 620 (FIG. 6), which may be referred to by URL 520. Webpage 700 may be used to validate that a.com is correctly access using http or https (e.g., to avoid compromising security of a system). In some implementations, webpage 700 does not automatically redirect to the user specified URL a.com 710 without user confirmation. An example optional "Debugging" setting may be set based on the present of the "flag=<debug_mode>" parameter. A viewer may clear the checkmark next to "Debugging" to turn off debugging.

Figure 8:
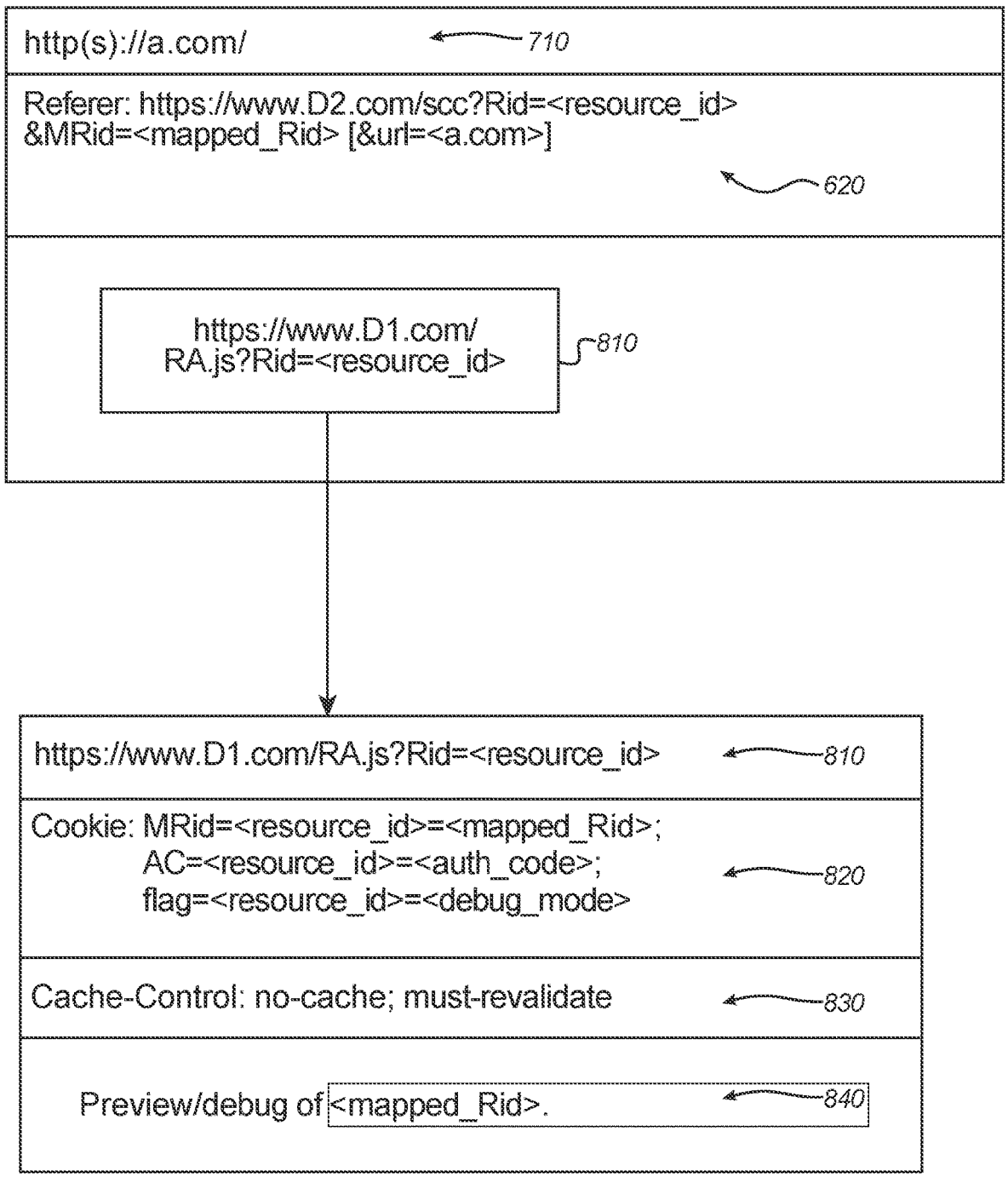
FIG. 8 shows an example resource access.

FIG. 8 shows an example resource access. The access may be initiated from anywhere, such as from a central location (FIG. 7) or from another location (e.g., a search engine, a product or service page, an application, directly on a.com, etc.). Here, an identifier 810 for the resource RA.js is shown embedded in another resource or webpage a.com 710, which may be referred to by another page 620. Webpage a.com 710 may be accessed using HTTP or HTTPS.

Link 810, for example, points to a resource RA.js on the D1.com domain. RA.js is accessed, for example, using HTTPS and with the parameter "Rid=<resource_id>". If RA.js is accessed using HTTP, D1.com may redirect the access to HTTPS to receive an authentication code (e.g., from a secure cookie). D1.com then validates the authentication code and provides the requested resource RA.js. In this example, RA.js is assigned an identifier <resource_id> and can be referenced using <resource_id>. In some implementations, the resource RA.js may not be assigned any identifier and can be identified using its name "RA.js" or "D1.com/RA.js". Cookies 820, which have been set for D1.com (e.g., in FIG. 5) prior to this access are returned to D1.com for it to use according to implementations. Optional http header 830 may be implemented (e.g., to indicate that resource RA.js should not be cached and each access of RA.js must be revalidated, etc.). Information 840 is shown to illustrate the example function/operation of the resource RA.js.

FIG. 9 shows another example optional operation. After accessing the requested resource, a viewer, or another user using the browser with which cookies have been set for the access, may clear the cookies using URL or link 910. For example, link 910 may be activated from "Click here to stop previewing/debugging." in FIG. 7.

Figure 10:
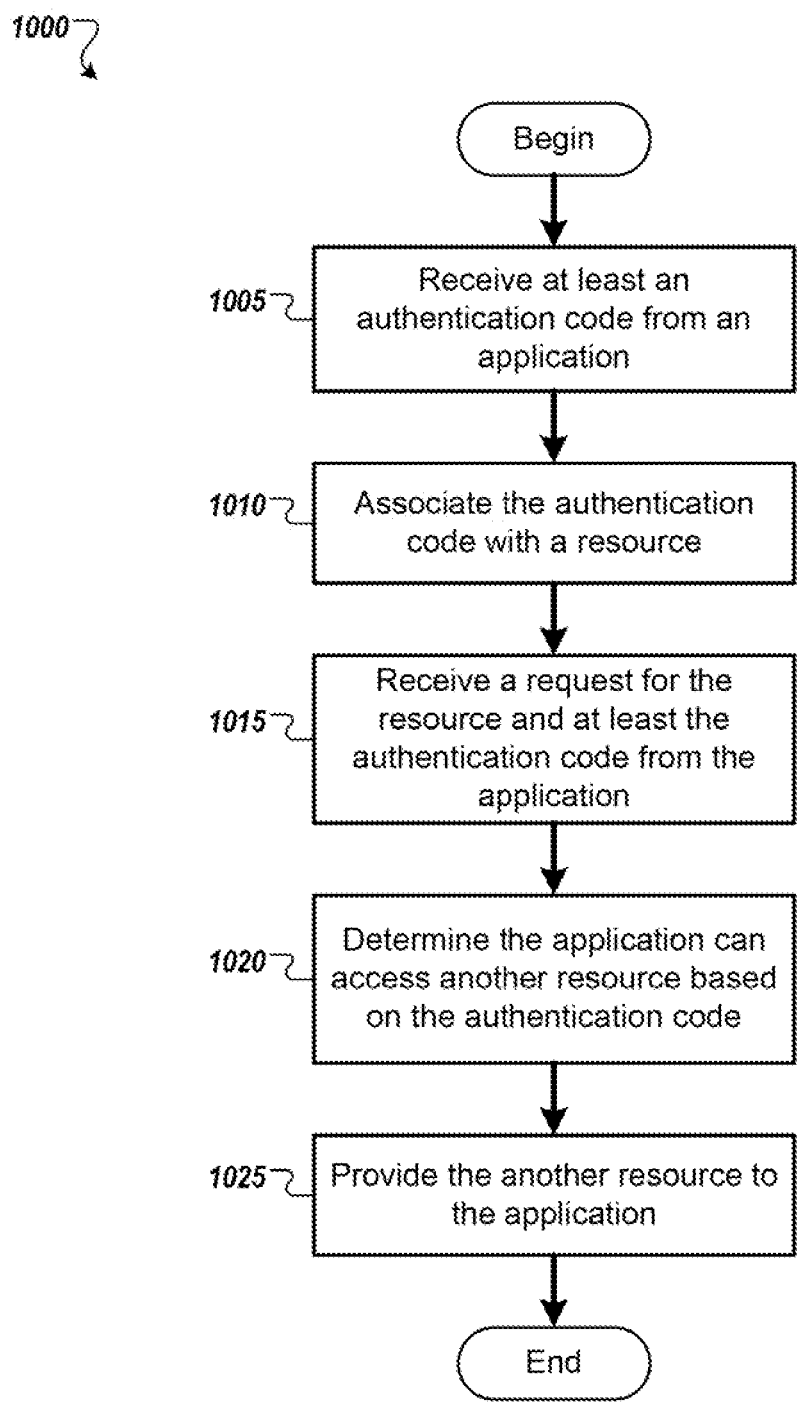
FIG. 10 shows another example of a process implementation.

FIG. 10 shows another example of a process implementation. At block 1005, a system or domain (e.g., D1.com) receives, from an application (e.g., a browser), an input that include at least an authentication code. The input may include a resource identifier, an identifier for another resource or another version of the resource. The input may include an authentication code and one or more other flags/settings (e.g., for turning on debugging, etc.). The input may be received in one or more cookies, which have been set previously.

At block 1010, the authentication code may be associated with the resource and/or a mapped resource. The association may be perform at or near access time (e.g., as described in FIG. 5) or at an earlier time (e.g., as described in FIG. 2). An authentication code may be associated with and limited to one or a certain number of resources. Another authentication code may be used to access more resources or unlimited number of resources, which means the another authentication code is automatically associated with the resources it can access.

At block 1015, the system receives, from the application, a request to access the resource. The request may include an identifier associated with the resource and/or an authentication code. The system then, at block 1020, determines based on the identifier and/or the authentication code whether the application can access the mapped resource. If it is determined that the requesting application and/or user can access the mapped resource using the identifier of the resource, the system provides or serves the mapped resource to the requesting application.

In some examples, process 1000 may be implemented with different, fewer, or more blocks. Process 1000 may be implemented as computer executable instructions, which can be stored on a medium, loaded onto one or more processors of one or more computing devices, and executed as a computer-implemented method.

Figure 11:
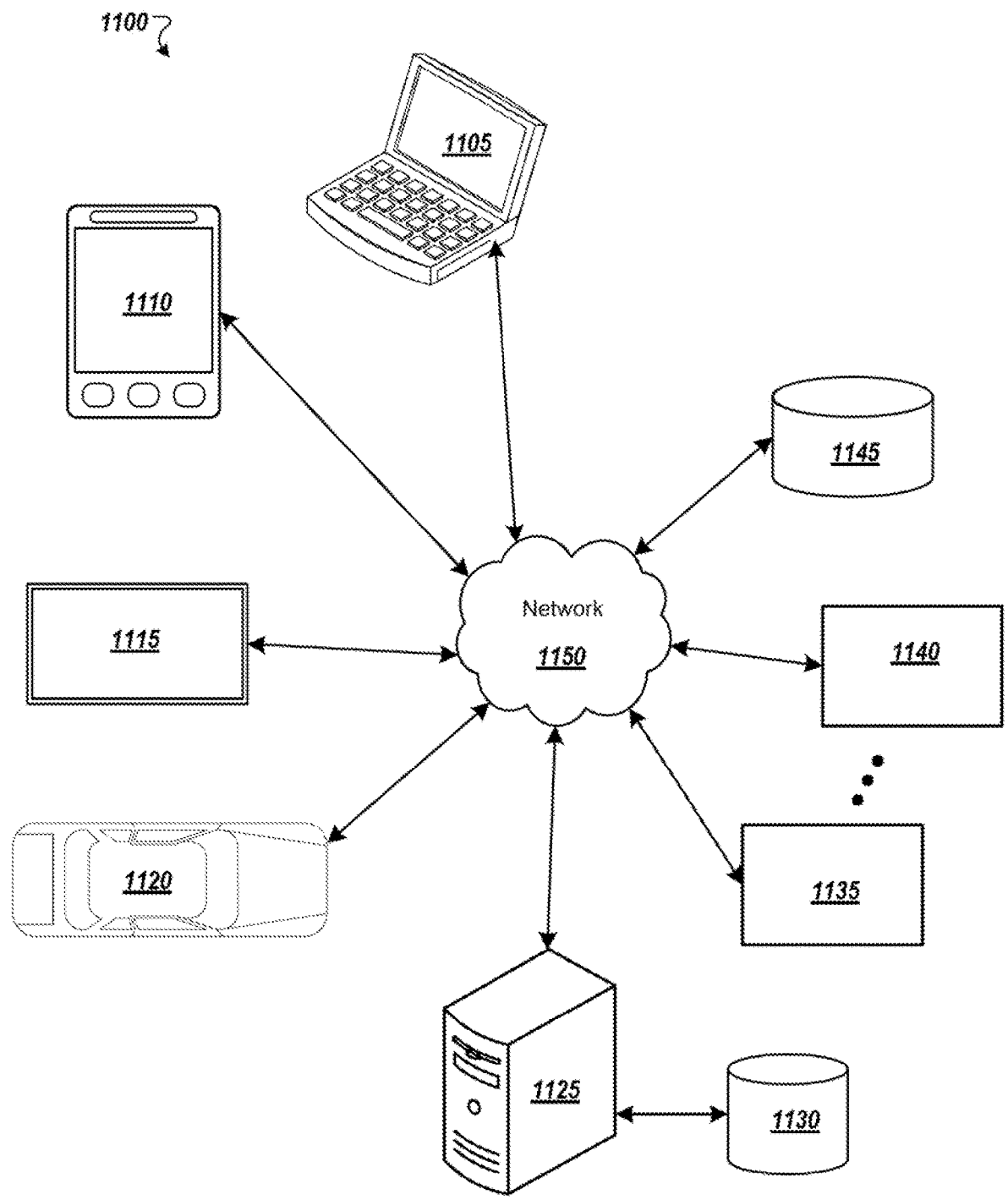
FIG. 11 shows an example environment suitable for some example implementations.

FIG. 11 shows an example environment suitable for some example implementations. Environment 1100 includes devices 1105-1145, and each is communicatively connected to at least one other device via, for example, network 1160 (e.g., by wired and/or wireless connections). Some devices may be communicatively connected to one or more storage devices 1130 and 1145.

An example of one or more devices 1105-1145 may be computing device 1205 described below in FIG. 12. Devices 1105-1145 may include, but are not limited to, a computer 1105 (e.g., a laptop computing device), a mobile device 1110 (e.g., smartphone or tablet), a television 1115, a device associated with a vehicle 1120, a server computer 1125, computing devices 1135-1140, storage devices 1130 and 1145.

In some implementations, devices 1105-1120 may be considered user devices (e.g., devices used by users, developers, viewers, etc. to access services, resources and/or issue requests). Devices 1125-1145 may be devices associated with service providers (e.g., D1.com, D2.com, etc., used by hosts, or service providers to provide services and/or resources, such as webpages, text, images, audios, videos, and/or information thereabout).

For example, a developer may grant a viewer access to a mapped resource from D2.com, which may be executed on one or more of devices 1125-1145. The viewer may access the mapped resource using an application executed on device 1105, 1110, 1115, or 1120.

Figure 12:
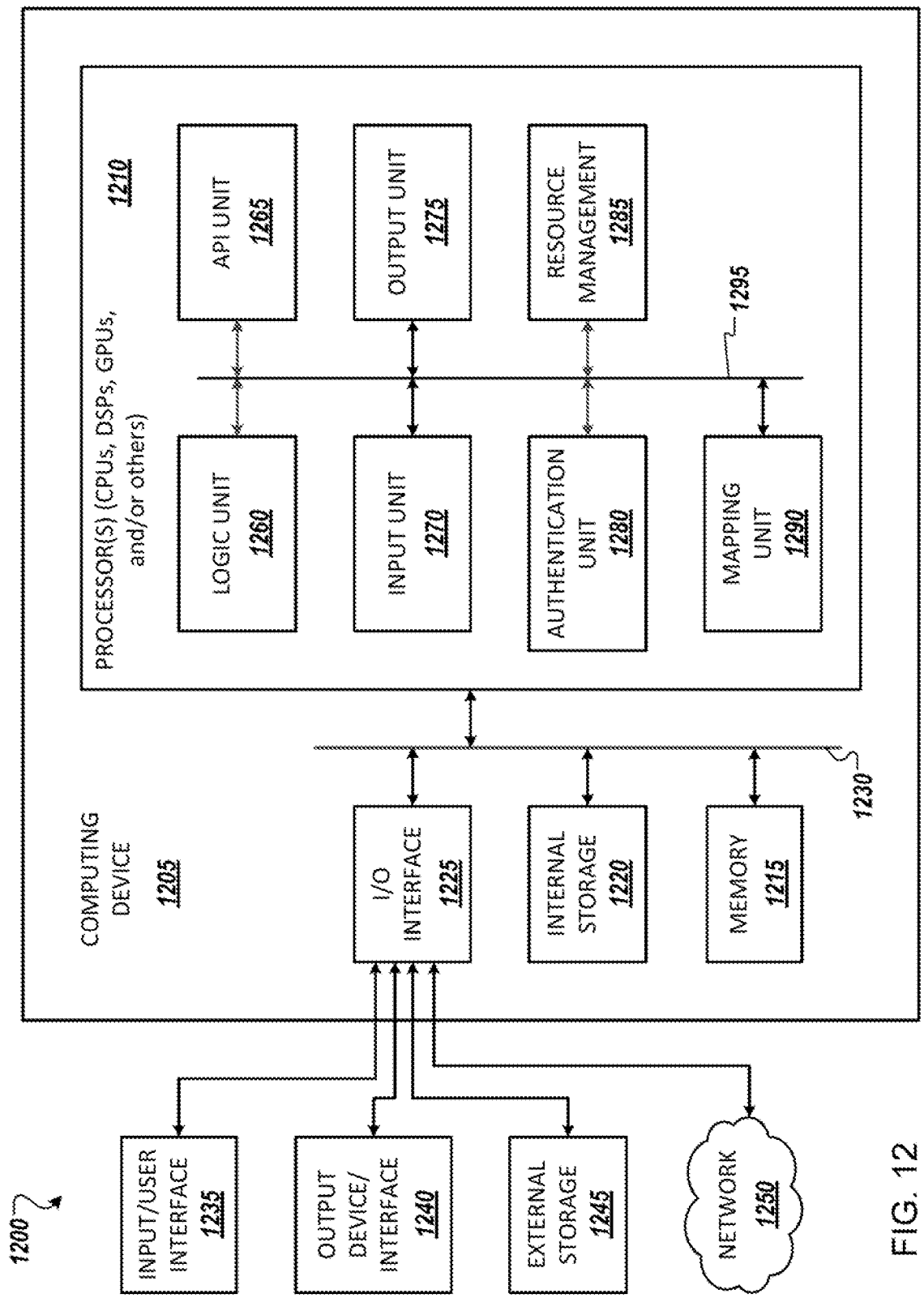
FIG. 12 shows an example computing environment with an example computing device suitable for use in some example implementations.

FIG. 12 shows an example computing environment with an example computing device suitable for use in some example implementations. Computing device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or I/O interface 1225, any of which can be coupled on a communication mechanism or bus 1230 for communicating information or embedded in the computing device 1205.

Computing device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computing device 1205. In other example implementations, other computing devices may function as or provide the functions of input/user interface 1235 and output device/interface 1240 for a computing device 1205.

Examples of computing device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1205 can be communicatively coupled (e.g., via I/O interface 1225) to external storage 1245 and network 1250 for communicating with any number of networked components, devices, and systems, including one or more computing devices of the same or different configuration. Computing device 1205 or any connected computing device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computing device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, authentication unit 1280, resource management 1285, mapping unit 1290, and inter-unit communication mechanism 1295 for the different units to communicate with each other, with the OS, and with other applications (not shown). For example, authentication unit 1280, resource management 1285, and mapping unit 1290 may implement one or more processes and/or example shown in FIGS. 1-10 above. The described units and elements can be varied in design, function, configuration, or implementation and are not limited to the descriptions provided.

In some example implementations, when information or an execution instruction is received by API unit 1265, it may be communicated to one or more other units (e.g., logic unit 1260, input unit 1270, output unit 1275, authentication unit 1280, resource management 1285, and mapping unit 1290). For example, when a request to access a resource along with one or more cookies are received by input unit 1270, an authentication code may be authenticated by authentication unit 1280. After the access is authenticated, mapping unit 1290 may determine where there is a resource mapping (e.g., <mapped_Rid>) exists or is available, and whether <mapped_Rid> identifies an actual resource. Resource management 1285 then identify and provide the requested resource or a mapped resource, as determined by mapping unit 1290, the requesting application.

In some instances, logic unit 1260 may be configured to control the information flow among the units and direct the services provided by API unit 1265, input unit 1270, output unit 1275, authentication unit 1280, resource management 1285, and mapping unit 1290 in some example implementations described above. For example, the flow of one or more processes or implementations may be controlled by logic unit 1260 alone or in conjunction with API unit 1265.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method when executed by data processing hardware causes the data processing hardware to perform operations comprising:
receiving, via an application, a resource request from a requesting user, the resource request comprising:
a first identifier identifying a first resource associated with a host resource; and
an authentication code associated with the first identifier, and
wherein the requesting user is not registered with the host resource;
determining that the authentication code authorizes access to the first resource identified by the identifier;
in response to determining that the authentication code authorizes access to the first resource identified by the identifier, identifying, using the authentication code, a second resource having a mapped association with the first resource identified by the first identifier; and
communicating, via the application to the requesting user, as a response to the resource request, the second resource having the mapped association with the first resource identified by the first identifier.

2. The method of claim 1, wherein:
the host resource comprises a website; and
the resource request further comprises a webpage having the first identifier embedded in the webpage, the webpage hosted by the website.

3. The method of claim 1, wherein the application comprises a web-browser application.

4. The method of claim 1, wherein a user registered with the host resource shared the authentication code with the requesting user.

5. The method of claim 4, wherein the user registered with the host resource has permission to grant access to the first resource identified by the first identifier.

6. The method of claim 1, wherein:
the host resource comprises a website; and
the authentication code corresponds to a browser cookie stored by the application in association with the website.

7. The method of claim 1, wherein the resource request comprises a link to a webpage of the host resource.

8. The method of claim 1, wherein the second resource corresponds to a version of the first resource.

9. The method of claim 1, wherein the first resource comprises a resource published to a production environment and the second resource corresponds to an unpublished version of the first resource.

10. The method of claim 1, wherein the communicated second resource is in a debug mode.

11. A system comprising:
a computing device; and
memory in communication with the computing device, the memory storing instructions that when executed on the computing device cause the computing device to perform operations comprising:
receiving, via an application, a resource request from a requesting user, the resource request comprising:
a first identifier identifying a first resource associated with a host resource; and
an authentication code associated with the first identifier, and
wherein the requesting user is not registered with the host resource;
determining that the authentication code authorizes access to the first resource identified by the identifier;
in response to determining that the authentication code authorizes access to the first resource identified by the identifier, identifying, using the authentication code, a second resource having a mapped association with the first resource identified by the first identifier; and
communicating, via the application to the requesting user, as a response to the resource request, the second resource having the mapped association with the first resource identified by the first identifier.

12. The system of claim 11, wherein:
the host resource comprises a website; and
the resource request further comprises a webpage having the first identifier embedded in the webpage, the webpage hosted by the website.

13. The system of claim 11, wherein the application comprises a web-browser application.

14. The system of claim 11, wherein a user registered with the host resource shared the authentication code with the requesting user.

15. The system of claim 14, wherein the user registered with the host resource has permission to grant access to the first resource identified by the first identifier.

16. The system of claim 11, wherein:
the host resource comprises a website; and
the authentication code corresponds to a browser cookie stored by the application in association with the website.

17. The system of claim 11, wherein the resource request comprises a link to a webpage of the host resource.

18. The system of claim 11, wherein the second resource corresponds to a version of the first resource.

19. The system of claim 11, wherein the first resource comprises a resource published to a production environment and the second resource corresponds to an unpublished version of the first resource.

20. The system of claim 11, wherein the communicated second resource is in a debug mode.

* * * * *